United States Patent [19]
Burenga

[11] 3,769,988
[45] Nov. 6, 1973

[54] LEGUME HARVESTER WITH AUGER FEEDS

[75] Inventor: Thomas I. Burenga, Evanston, Ill.

[73] Assignee: FMC Corporation, San Jose, Calif.

[22] Filed: July 21, 1972

[21] Appl. No.: 274,019

[52] U.S. Cl............ 130/30 H, 214/83.32, 214/519
[51] Int. Cl................................................. A01d
[58] Field of Search............ 130/30 H, 27 T, 30 C; 56/364, 158; 214/83.32, 520, 521, 519

[56] References Cited
UNITED STATES PATENTS

| | | | |
|---|---|---|---|
| 2,390,680 | 12/1945 | Ausherman | 56/158 |
| 3,007,475 | 11/1961 | Long | 130/30 C |
| 3,089,601 | 5/1963 | Chaney et al. | 214/83.32 |
| 3,236,035 | 2/1966 | Hamachek et al. | 130/30 H |
| 3,439,683 | 4/1969 | Keller | 130/27 T |
| 3,701,239 | 11/1972 | Hennen | 130/27 T |
| 3,709,231 | 1/1973 | Looker et al. | 130/30 H |

Primary Examiner—Antonio F. Guida
Attorney—F. W. Anderson et al.

[57] ABSTRACT

A field harvester for a crop of vines with attached legumes has a rotating drum screen with a main central beater and an infeed auger of large diameter projecting forwardly past the screen. The infeed auger has a peripheral housing with a feed opening formed in the lower front portion thereof. A pair of oppositely rotating crop elevator augers is mounted in a housing that connects to the opening in the infeed auger housing so that a mass of vines and legumes is fed up into a lower portion of an infeed auger housing and thereupon drops into the large rotating drum screen without being excessively compacted. A shelled crop conveyor runs forwardly beneath the drum screen and in its delivery end extends past the screen. A primary trash cleaning blower is mounted directly above the delivery end of the crop conveyor so that its inlet duct delivers trash directly to the fan portion of the blower without the need for elbows or the like in the duct.

10 Claims, 15 Drawing Figures

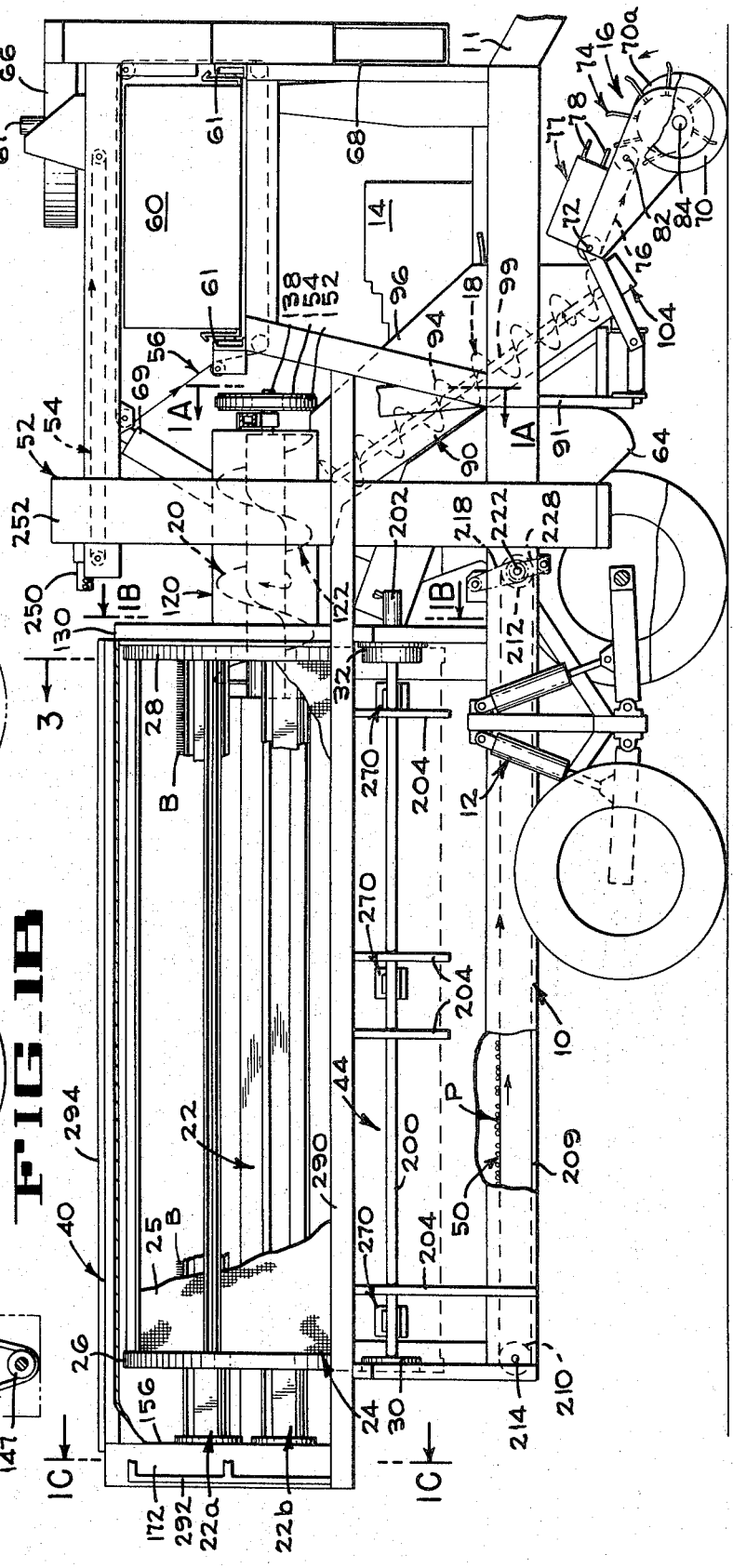

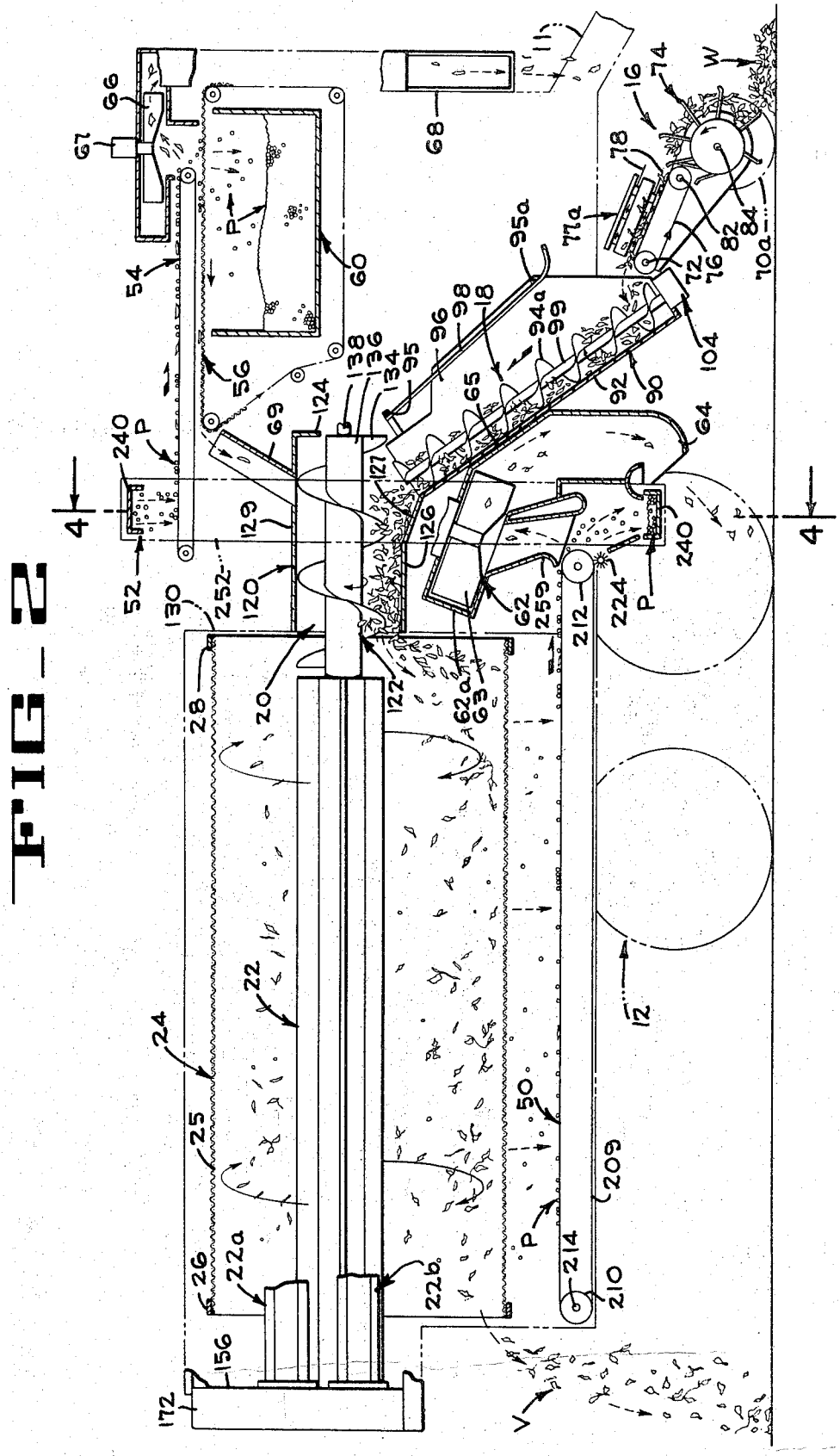

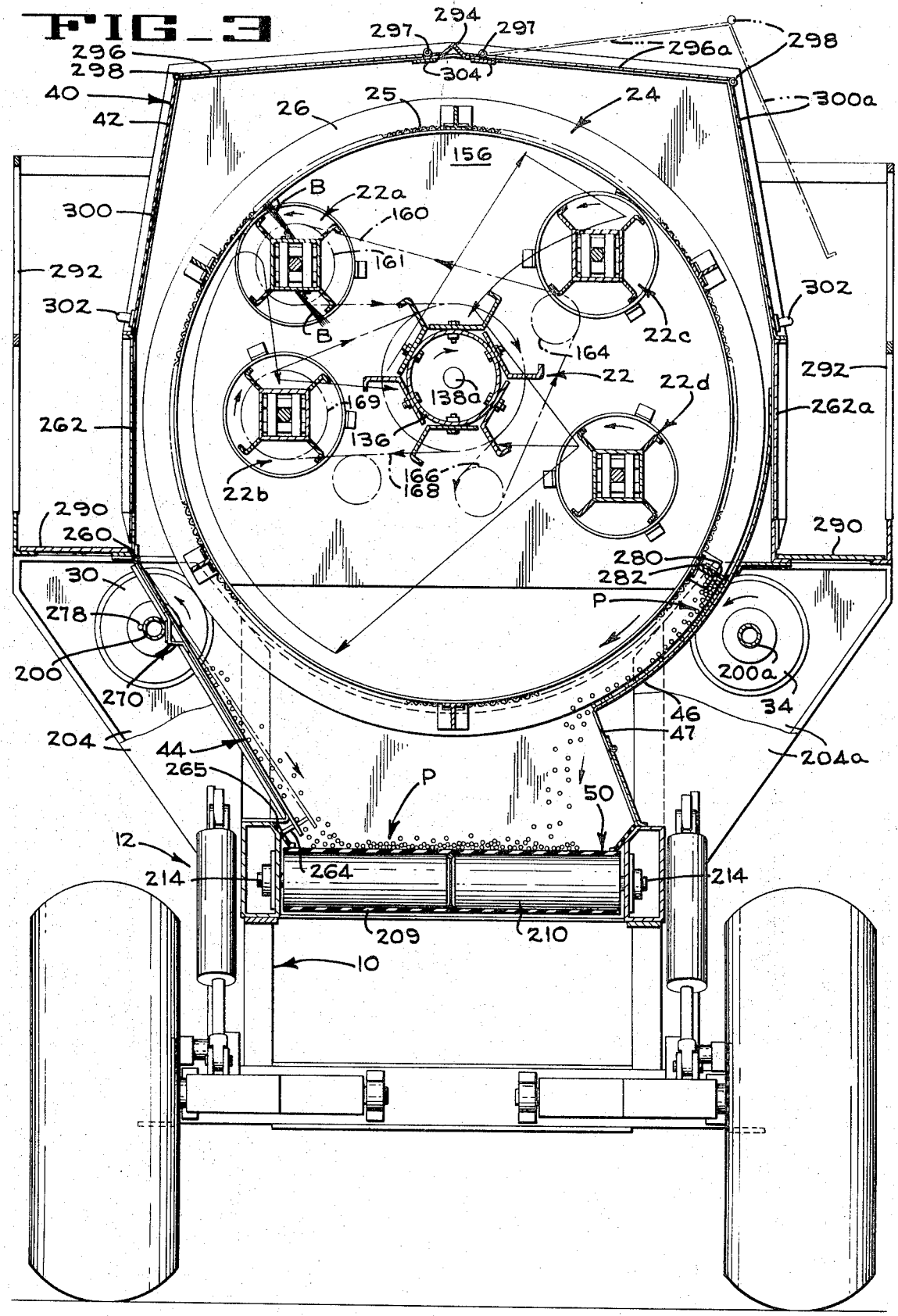

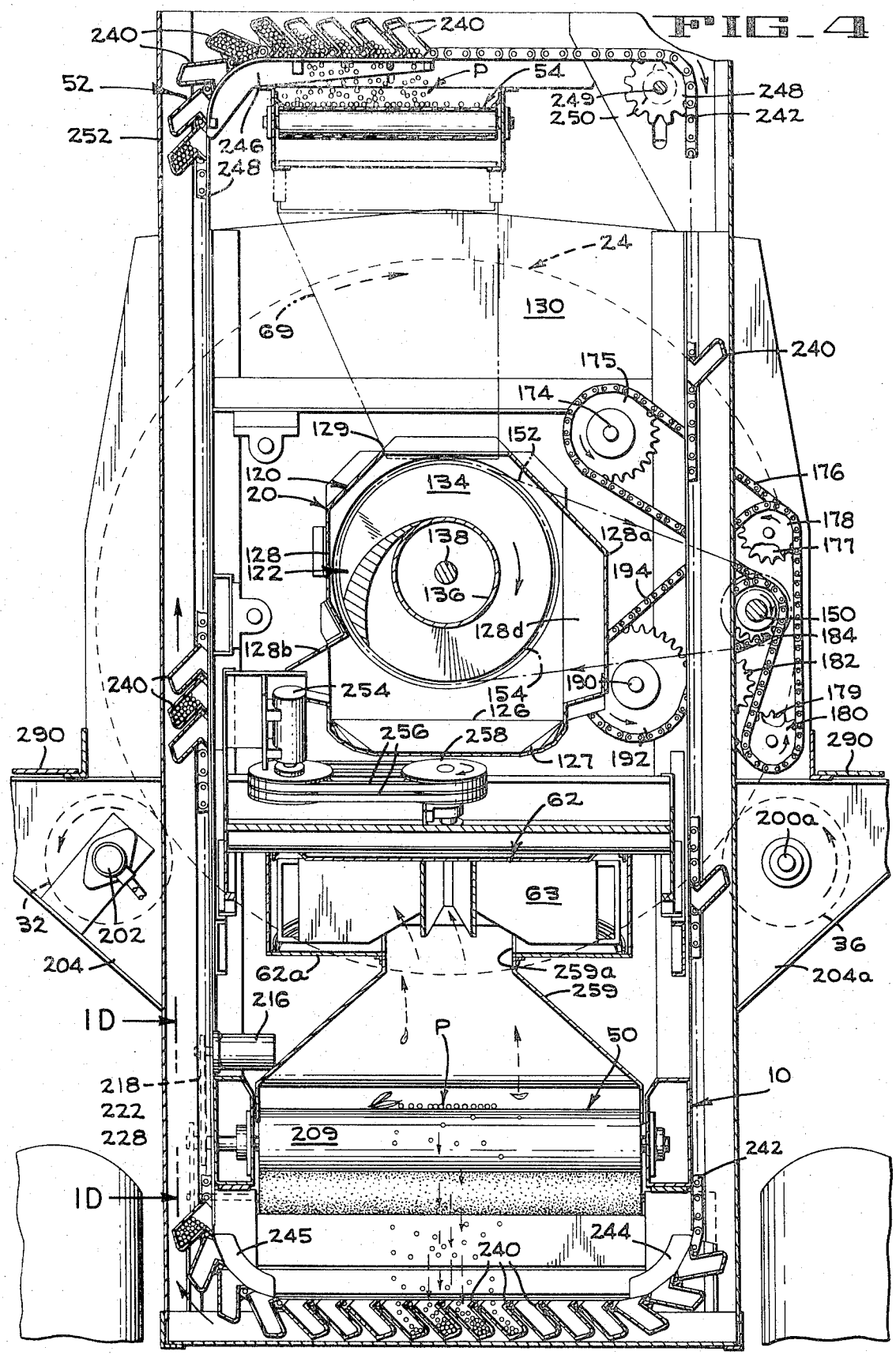

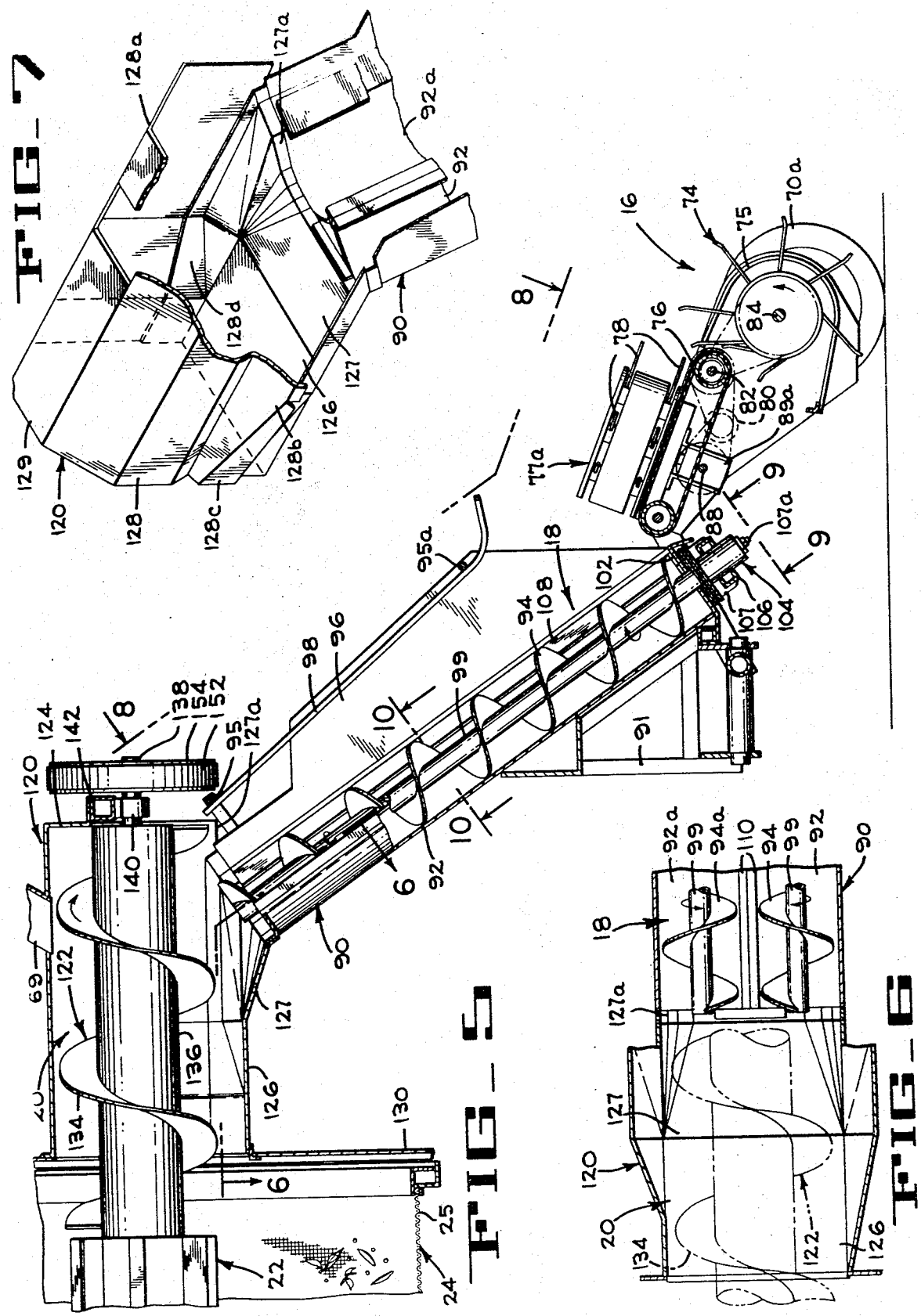

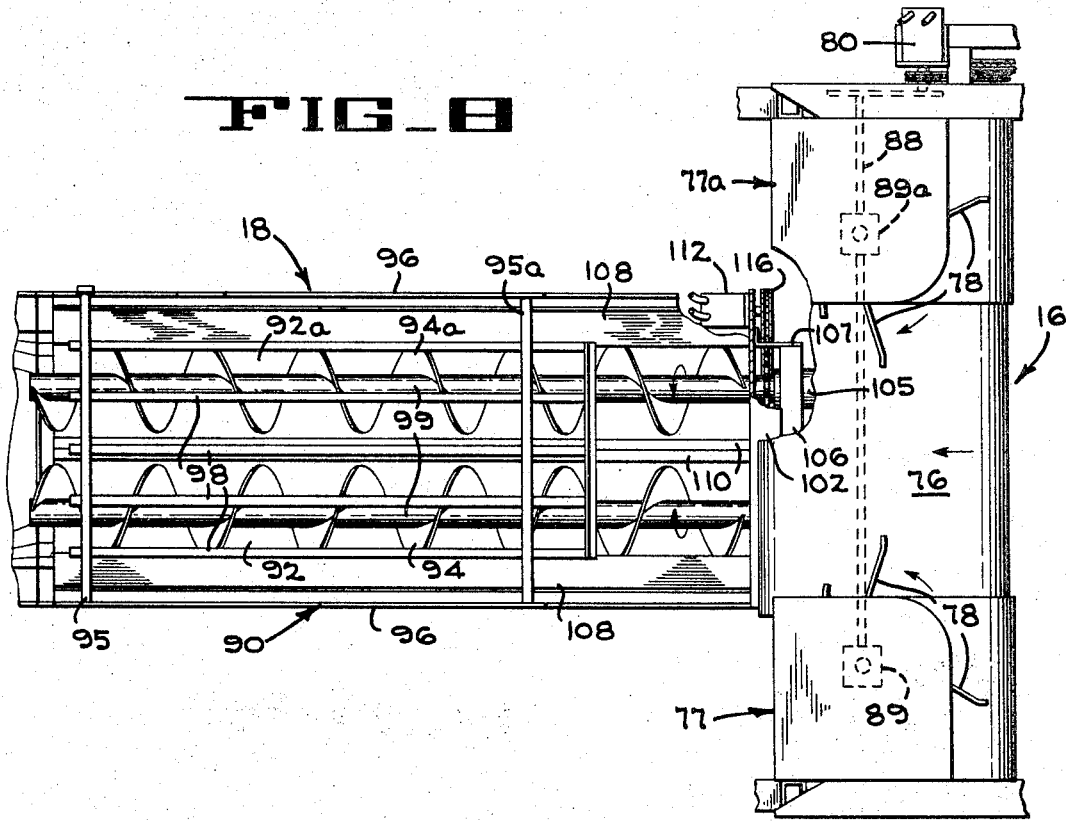
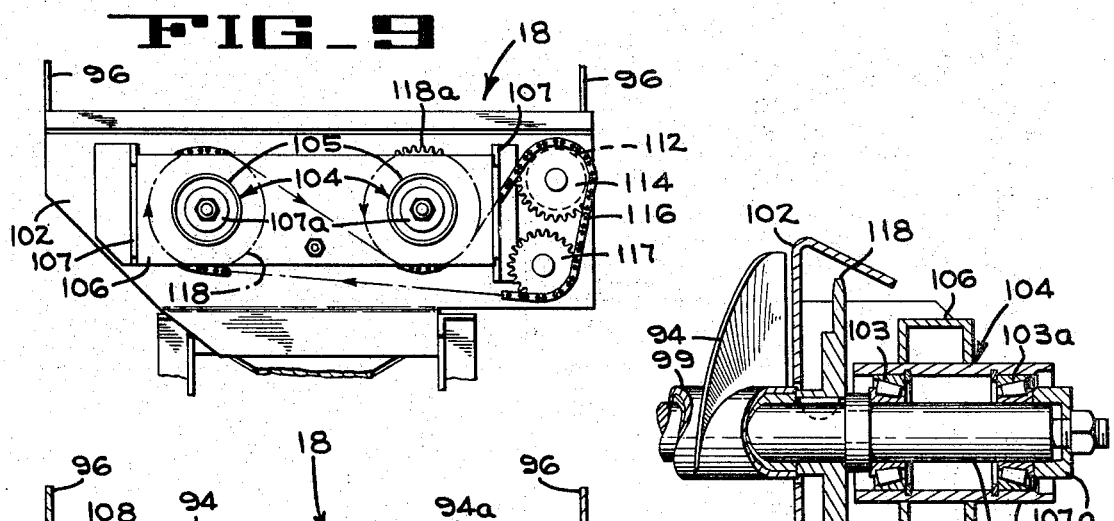
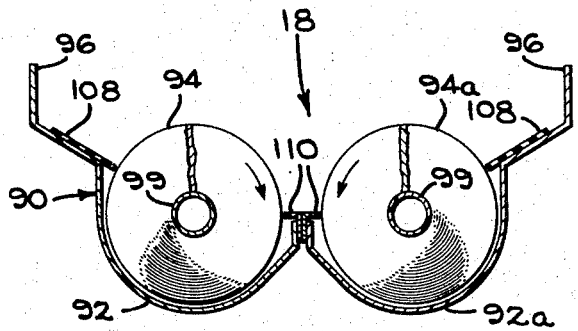

LEGUME HARVESTER WITH AUGER FEEDS

REFERENCE TO RELATED APPLICATIONS

The multiple beater threshing assembly forms the subject matter of the copending application of Looker et al., Ser. No. 141,900, filed May 10, 1971, assigned to the FMC Corporation now U.S. Pat. No. 3,709,231, issued Jan. 9, 1973.

The oscillating side panel drum screen shroud forms the subject matter of the copending application of Looker et al, Ser. No. 272,617, filed July 17, 1972, assigned to the FMC Corporation (SJ 5329).

The hopper dump structure forms the subject matter of the copending application of Scribner Ser. No. 272,618 filed July 17, 1972, also assigned to the FMC Corporation (SJ 6507).

FIELD OF THE INVENTION

The present invention relates to agricultural harvesters and more particularly to field harvesters or combines for vine attached leguminous crops such as peas, beans or the like.

DESCRIPTION OF PRIOR ART

The Greedy et al. U.S. Pat. No. 2,910,070, Oct. 27, 1959 discloses a pea sheller wherein loose pods only are introduced into a hopper projecting from the upper peripheral wall of an infeed auger housing. An infeed auger projecting from the shaft of a single, large main beater within a drum screen feeds the loose pods into the screen. A forwardly moving shelled crop conveyor runs beneath the drum screen and stops short of the infeed end thereof. This is not a field harvester and if a mass of vines with attached legumes were fed into the infeed auger from above, as in the Greedy et al patent, they would fall upon the auger hub and be twisted around and compacted, thereby reducing shelling efficiency.

The U.S. Pat. to Hamachek III et al. No. 3,236,035, Feb. 22, 1966, shows a field harvester for leguminous plants such as peas and lima beans. In this harvester, the vines and attached crop are fed by rakes that deliver the crop to the lower front closure plate for the drum screen. As seen in FIG. 3, the forwardly running crop conveyor beneath the drum screen does not project past the end of the drum screen to any significant extent and delivers the crop directly to an elevating bucket conveyor.

The U.S. Pats. to Rowland-Hill et al. No. 3,481,342, Dec. 2, 1969 and to Van Buskirk, No. 3,481,343, Dec. 2, 1969 are directed to field threshers for grain. These threshers admit the grain to the front face of a housing for an infeed auger. The auger is an extension of the shaft of a threshing rotor and fan assembly that substantially fills a nonrotating screen. Since grain is a relatively compact, nonfragile crop, it is possible to deliver such a crop to the front end of an infeed auger. However, a vine crop such as peas or the like is bulky and it is important to keep the vines loose and fluffy for threshing. Feeding such a crop into the front end of an auger as in the aforesaid Rowland-Hill et al and Van Buskirk patents would cause compaction of the mass which would interfere with subsequent threshing and result in damage to the product.

The U.S. Pat. to Jones et al., No. 3,609,948, Oct. 5, 1971 discloses (FIG. 6) a corn harvester wherein ears of corn are fed laterally into the lower ends of a pair of elevating augers, the latter delivering the corn to a combine unit 10 (FIG. 1).

SUMMARY OF THE INVENTION

The present invention is directed to the problems presented by field harvesters for the legumes of the type wherein large masses of crop consisting of vines with attached pods of peas, beans or the like are picked up in the field, usually from windrows. Important considerations in harvesting and threshing of this fragile type crop are:

1. The pickup and conveying units should not mash and damage the pods and the crop therein.
2. Large masses of vines and attached crop must be handled without compacting the masses before they enter the drum screen for threshing.
3. The crop should be introduced into the drum screen in a loose and fluffy condition to facilitate threshing without excessive dwell time in the threshing part of the harvester.
4. As much trash, pods or the like should be removed from the threshed crop before it enters the hopper bin of the harvester. If trash cleaning blowers are provided, they should be positioned in a manner that renders their operation efficient and should not be subject to clodding of their inlet or outlet ducts.

The legume harvester of the present invention has a number of features that cooperate to solve the problems usually presented by harvesters as outlined above. One of the features of the present legume harvester is that the central or main beater has a forward extension which mounts the infeed auger. This beater has a small diameter. A housing surrounds the infeed auger and the feed opening to the housing is in the lower front portion of a peripheral wall of the housing. Also, the lower wall of the infeed auger housing is relatively widely spaced from the auger itself, as is the wall on the downwardly turning side of the auger. With this housing and infeed opening construction, the mass of vines and attached legumes can be fed with a high flow rate up into the housing space provided below the bottom of the auger so that the auger advances the mass along the channel formed by the bottom wall of the auger housing directly into the interior of the screen drum. Here the mass falls toward the bottom of the screen for maintaining its fluffy condition for sufficient threshing without too long a dwell time in the drum screen itself.

In accordance with the preferred embodiment of the invention, the front bottom feed opening of the infeed auger housing is supplied with a noncompacted mass of vines and attached legumes by a pair of oppositely rotating infeed augers which have confining housings along their lower side portions. These augers have a combined diameter that is substantially equal to the diameter of the large infeed auger, and feed the mass principally along the bottom portions of the augers, up into the infeed auger housing for further handling in the manner just outlined.

As previously mentioned, it is important that the fresh crop be cleaned of trash or the like before being delivered to the final dump hopper. In accordance with the present invention, the combination of the bottom infeed crop elevating augers and the projecting housing for the infeed auger provides room for the mounting of a primary blower or cleaning fan between the auger assembly and the front or delivery end of the drum screen housing. To take advantage of this blower location, the forwardly running crop conveyor disposed beneath the drum screen housing is extended past the front end of the drum screen and drops crop onto a transversely running bucket conveyor. As a result of these constructions, the inlet duct for the primary cleaning fan can project almost straight down from the fan housing itself to the delivery end of the crop conveyor, so that there are no bends or elbows in the inlet duct that reduce the cleaning efficiency and promulgate clogging. Furthermore, due to the auger arrangement just described, the discharge duct from the fan need have no significant bends along its path to the ground. These features combine to provide an efficient primary cleaning action on the crop after it has been threshed in the drum screen.

Another feature of the invention is in the housing for the infeed auger, which is relatively widely spaced from the bottom of the auger and has a side wall and top wall that can be closely spaced to the upwardly turning and top side of the auger. This prevents wrap around or carryover between the edges of the auger flight and the housing. Furthermore, the housing side wall at the downwardly turning side of the auger is also widely spaced so that vines that are carried up around the auger lug between the spaces of the flight as opposed between the edges of the flight and the housing, thus providing space for advance into the drum screen from the auger without compaction.

By mounting the infeed auger on a central beater of relatively small diameter which forms one of a number of beaters disposed about a number of satellite beaters, the aforesaid dropping action on the vines with its fluffing, noncompacting delivery is facilitated.

DESCRIPTION OF THE DRAWINGS

FIG. 1 is a side view of a harvester embodying the invention with parts broken away.

FIGS. 1A, 1B, and 1C are diagrams taken as indicated in FIG. 1 showing certain drive chains.

FIG. 1D is a section taken along line 1D—1D of FIG. 4.

FIG. 2 is a view like FIG. 1 but in vertical section with some of the parts shown diagrammatically, others omitted.

FIG. 3 is an enlarged section taken on 3 — 3 of FIG. 1 showing the driven beaters.

FIG. 4 is an anlarged section taken on 4 — 4 of FIG. 2.

FIG. 5 is a partial enlarged vertical section showing the auger feed mechanism.

FIG. 6 is a developed view looking along 6 — 6 of FIG. 5.

FIG. 7 is a perspective showing the shrouding for the crop elevating and infeed augers.

FIG. 8 is a view looking along 8 — 8 of FIG. 5 showing the crop elevating augers.

FIG. 9 is a view along 9 — 9 of FIG. 5 showing the twin auger drive.

FIG. 10 is a section through the twin elevating augers taken on 10 — 10 of FIG. 5.

FIG. 11 is an enlarged detail showing the mounting for the lower end of one of the crop elevating augers.

GENERAL DESCRIPTION

In the embodiment of the invention described, the field legume harvester is of the type that is towed by a tractor or the like but the combine mechanism and the various conveyors are self-powered.

Since legume harvesters of this general type are well known in the art, only those details of the frame and chassis structure essential to an understanding of the general nature of the machine will be explained.

Referring to FIG. 1, the harvester has a main frame indicated generally at 10, to which is connected a tow bar 11, shown incompletely. The frame is supported on two pairs of wheels that embody automatic leveling mechanisms such as that in the aforesaid U.S. Pat. to Carmichael Jr. et al. No. 3,033,584. This wheel and leveling structure is indicated generally at 12 in FIG. 1, and since the details thereof are not critical to the present invention they will not be described in detail. The harvester mechanisms are powered by an internal combustion engine 14 for turning the drum screen and beaters. Various hydraulic motors are driven from a conventional pump unit (not shown) that is also powered by the engine. The controls (not shown) for the engine and the various hydraulic motors are mounted on the harvester above the tongue 11 and face forwardly for operation by the tractor driver. This feature is conventional in towed harvesters and since it is not critical to the invention is not illustrated. The harvester includes a crop pickup indicated generally at 16, most of the details of which are not critical to the present invention. The pickup 16 picks up the crop of cut vines with attached legumes that have been placed in windrows W and directs the crop to a twin elevating auger assembly of the present invention, indicated generally at 18 and shown in detail in FIGS. 5 - 10 and other figures.

The elevating auger assembly 18 delivers the crop to a single infeed auger assembly of the present invention indicated generally at 20, which auger forms a forward extension of the shaft for the central or main beater 22 (FIGS. 2, 3 and 5), as will be described presently. A large rotating drum screen indicated generally at 24 forms a major component of the threshing unit of the harvester. This screen also appears in FIG. 2 and in section in FIG. 3. In accordance with conventional practice the drum screen 24 includes a screen proper 25, which may be formed in panels, and has end rings 26,28 which are supported on rollers 30,32 on one side (FIG. 1) and by corresponding rollers 34 (FIG. 3) and 36 (FIG. 4) on the other side.

The drum screen 24 is surrounded by a shroud (FIG. 3) indicated generally at 40 and which includes a hinged panel upper section 42 that does not conform to the drum screen periphery. The shroud has a depending and oscillating side panel 44 and a depending curved side panel 46, that prevent adherence of threshed crop. The construction and mode of operation of this shroud construction form the subject matter of the aforesaid copending application of Looker et al., Ser. No. 272,617, filed July 17, 1972 (SJ 5329).

As to crop flow, and as seen in FIG. 2, the vine crop is delivered in a loose condition from the pickup 16 and the elevating auger unit 18 to the interior of the drum screen 24 by the infeed auger assembly 20 and drops into the screen to be threshed by beaters 22 - 22d (FIG. 3) inside the screen with the vines V ejected from the rear of the screen as shown in FIG. 2. These beaters form the subject matter of the aforesaid Looker et al application.

The threshed crop P (e.g., peas or beans) falls through the screen 25 and reaches the side panels 44, and 46 (FIG. 3) falling onto a forwardly running crop conveyor 50. This conveyor, in the embodiment described, is about 36 inches wide. Of course some crop drops directly onto the conveyor and some crop falls onto the side panels 44,46 from the vertical sides of the shroud 40. As seen in FIG. 2, the conveyor 50 extends past the drum screen and delivers the crop to the lower reach of a forwardly disposed endless bucket conveyor 52 that runs transversely around the machine (FIG. 4). The upper transverse reach of the bucket conveyor 52 dumps the crop onto an upper, forwardly running delivery conveyor 54 (FIGS. 2 and 4) in a manner described in detail in the aforesaid copending application of Scribner. The upper conveyor 54 delivers the crop to the upper, rearwardly running reach of a mesh type podder conveyor 56, the construction of which is known in the art, and the details of which are not critical to the present invention. The podder conveyor, which screens out trash and pods, has a mesh with openings sufficient to drop the peas, beans or the like into a dump bucket or hopper 60 (FIG. 2) the construction of which forms the subject matter of the aforesaid copending application of Scribner. The hopper 60 can be shifted laterally on tracks 61 (FIG. 1) for dumping into a vehicle (not shown) along side the harvester.

In order to remove trash that works its way through the drum screen 24 and is picked up by the crop conveyor 50 along with the crop itself, two blowers are provided. As seen in FIGS. 2 and 4, a lower or primary blower 62 is disposed beneath the infeed auger assembly 20 and draws air up past the delivery end of the crop conveyor 50 and hence removes most of the trash, ejecting it through a discharge duct 64 to the ground. The fact that the crop conveyor 50 projects forwardly past the end of the drum screen 24, coupled with the fact that the elevating auger assembly 18 can function at a steep angle of inclination, provides room for mounting the blower 62 directly above the delivery end of the conveyor 50. Any trash that remains with the crop is carried up by the bucket conveyor 52 and onto the forwardly running delivery conveyor 54. As is also seen in FIG. 2, when the conveyor 54 drops the crop onto the podder conveyor 56, an upper, or secondary blower 66 draws trash up and away from the delivery end of the conveyor 54 and blows it out a forward discharge duct 68. Pods which are not light enough to be drawn up by the trash blowers just described and hence remain on the podder conveyor are delivered by the podder conveyor 56 back into the infeed auger assembly 20 coming, by means of a chute 69 best seen in FIG. 2.

Having completed a general description of the harvester and the manner in which crop flows therethrough more significant elements of the various units previously referred to will now be described.

PICKUP

The pickup 16, in the embodiment illustrated, works on windrows W (FIG. 2) and is of known construction although portions cooperate with the twin auger feeder unit 18 for efficient, nonjamming crop handling.

Referring principally to FIGS. 5 and 8 the pickup 16 is supported on front wheels 70,70a (see FIG. 1), and is pivotally suspended from the framework of the harvester about the axis of a conveyor shaft 72. The pickup includes a rotatable, retractable finger rake indicated generally at 74, the fingers of which project through a curved shield 75 (FIG. 5). This rake is of known construction and its details are not critical to the present invention. The rake 74 delivers the crop to a rearwardly running, upwardly inclined conveyor belt 76 and rotating side mounted gathering units 77,77a (FIG. 8) are disposed at each side of the conveyor 76. The side gathering units have rearwardly moving rake fingers 78.

The central belt 76 with the assistance of the side gathering units 77,77a deliver a band of vines and attached legumes to the twin auger elevating unit 18 of the present invention. The rake fingers 78 of the units 77,77a move backwardly toward the auger unit 18 and are so disposed in cooperation with the traveling belt 76, the crop is smoothly channeled to a band or ribbon that enters the upper side of the lower end of the auger unit 18 without jamming and mashing.

In order to drive the pickup reel 74 and the conveyor belt 76, a hydraulic motor 80, seen in dotted lines in FIG. 5 is connected by chain and sprocket gearing not important to the present invention, that drives the shaft 82 for the forward pulley of the conveyor 76. Chain sprocket gearing, also not critical to the present invention runs from the aforesaid shaft 82 to the shaft 84 for the reel 74 (FIG. 5). The rake fingers 78, which are mounted on a hub with a retraction mechanism now well known in the art hence not illustrated. The hydraulic motor 80 (FIG. 8) with chain and sprocket gearing drives a crossshaft 88 that drives vertical gear boxes 89,89a which operate the vertical shafts for the mechanism (not shown) that rotates and retracts the aforesaid side rake fingers 78.

ELEVATING AUGERS

The elevating auger unit 18, which forms the subject matter of the present invention, will now be described in more detail with reference to FIGS. 2 and 5 – 11. This unit is capable of picking up a large mass of crop from windrows and delivering it to the infeed auger assembly 20 without compacting the vines.

The elevating augers are mounted in a twin auger channel indicated generally at 90 (FIG. 10) which channel is supported in the framework at its lower portion by frame structure indicated generally at 91 in FIGS. 1 and 5, the details of the frame not being important. The channel 90 includes individual auger channels 92,92a (FIG. 10) for receiving the oppositely rotating augers 94,94a. The auger housing 90 has upstanding side flanges 96 (FIG. 5) which support cross bars 95,95a (FIG. 8) that mount a plurality of longitudinal bars 98. These bars act as safety guards and confine the crop to insure that it falls down into the augers 94,94a.

The augers 94,94a are supported along their length by their respective channels 92,92a (FIG. 10) and they are only mounted in bearings at their lower ends (FIGS. 5 and 11). Each auger has a sleeve-like hub 99 (FIGS. 10 and 11) secured to a shaft 100 with the bearing assembly for the auger 94 appearing in FIG. 11. The shaft 100 projects past a lower fixed end plate 102 for the auger housing and is supported in opposed tapered roller bearings 103, 103a in a bearing unit 104, having a sleeve 105 of which is welded to a transverse frame channel 106. The channel 106 is secured by gusset plates 107 to the end plate 102 for the auger housing 90. A clamp nut and collar assembly 107a secures the end of each shaft 100 in the bearing unit 104. As best understood from FIG. 10, winding and massing of the vines fed to the elevating augers 94,94a is prevented by the installation of flexible wipers 108 on the upwardly turning side of each auger. Also, scraper flanges 110 supported along the midplane of the auger housing 90 are provided between the augers. The augers 94,94a are driven in opposite directions by a hydraulic motor 112, (FIG. 8) and shown in dotted lines in FIG. 9. The motor drives a sprocket 114 (FIG. 9) and a chain 116 that passes over an idler 117. Sprockets 118 and 118a are connected (FIGS. 9 and 11) to the shafts 100 for the augers 94,94a and the chain 116 is trained around these sprockets in a manner that drives them in the opposite directions indicated in FIG. 10. In the embodiment described, the augers 94,94a are about 10 inches in diameter and rotate at about 120 RPM.

INFEED AUGER ASSEMBLY

As previously mentioned, in accordance with the present invention, material from the twin auger unit 18 is delivered to the lower outer end of an infeed auger assembly 20 associated with the main beater 22 within the drum screen 24.

As seen in FIGS. 5 - 7, the twin auger housing 90 just described merges with the lower end of a sheet metal casing or housing indicated generally at 120 and which houses a large diameter infeed auger 122. The relative sizes are such that the infeed auger 122 has a diameter that is substantially equal to the overall width of the two feed augers 94,94a (see FIG. 6). In the present example, the auger 122 has a diameter of about 20 inches, and rotates at about 140 to 280 RPM, depending on the nature of the crop.

When harvesting peas, the auger will usually be operated at about 170 RPM, whereas when harvesting lima beans, the speed will usually be about 240 RPM.

The housing 120 for the infeed auger 122 has an outer end plate 124 (FIG. 5) that covers the upper end portion of the auger and a flat bottom wall 126 which is flared downwardly and forwardly at 127 for connection to the twin auger housing 90. This construction provides a crop inlet opening 127a, FIGS. 5 - 7. Side walls 128, 128a and a top wall 129 complete the housing (FIGS. 4 and 7). The auger housing 120 is secured to an end plate 130 connected to the harvester framework and disposed closely adjacent to the ring 28 for the drum screen 24 (FIG. 5). As seen in FIG. 5, a single large flight 134 for the auger 122 is mounted on an extension of the tubular hub 136 for the main beater 22, as shown in FIGS. 3, 4 and 5. The flight 134 has a pitch of about 18 ¾ inches. The outer end of the auger hub 136 is connected to a stub shaft 138 supported in a bearing 140 in frame structure 142 as seen in FIG. 5.

A field harvester for legumes must pick up a large mass of vines and attached legumes from windrows. It is important that the vines be kept fluffy for subsequent threshing and that the fragile crop of peas, beans or the like not be damaged. As can be seen in FIGS. 2 and 5 there is a large clearance between the bottom wall 126 of the infeed auger housing 120 and the auger itself. This clearance, coupled with the flared bottom inlet 127 provides a noncompacting feed path chamber for the crop, as the latter is advanced from above the mass by the infeed auger 122. On the other hand, the sidewall 128 (FIG. 4) on the upturn side of the auger 122, connects to the bottom wall of the housing by a radial wall 128b (FIG. 5), so that the side wall 128 and the upper portion 129a of the top wall 129 are much closer to the auger 122, and prevent trapping of the vines between the auger and these housing walls. The downturn side wall 128a of the infeed auger housing is more widely spaced from the auger which also provides a chamber that facilitates crop advance and prevents compaction of any crop that is carried around by the auger itself.

As seen in FIG. 7, the radial side flange 128b is narrowed down at 128c, and the side wall 128a is brought in at 128d, to provide a converging side entrance throat to the auger 122.

As seen in FIG. 1A, the stub shaft 138 for the infeed auger 122 is driven from the engine 14 by a V-belt 146 driven by an engine pulley 147 and driving a large pulley 148 on a jackshaft 150. The jackshaft 150 also carries a small pulley 149 that drives a V-belt 152 trained around a larger pulley 154 on the end of the auger stub shaft 138. Thus, with the drive just described, the infeed auger 122 as well as the main beater 22 are driven by engine power and as will be seen, other beaters 22a - 22d (FIG. 3) within the drum screen 24 derive their power from the engine via the main beater 22.

BEATERS

In addition to the main beater 22, the beater assembly shown in FIG. 3 includes a stripper beater 22a mounting a pair of screen cleaning brushes B; a control beater 22b that receives crop from the control beater 22a and flings the crop to the main beater 22; a stripper beater 22c that flings crop from the screen 25 back to the main beater 22; and a sieving beater 22d that receives crop from the main beater 22 and flings it to the drum screen 25. This beater principle forms the subject matter of the copending application of Looker et al., Ser. No. 141,900 mentioned previously. However, for ready reference the beater drives will be described in some detail.

At the rear of the machine, all of the beaters are rotatably mounted in an end plate 156, seen in FIGS. 1 and 2 which is spaced a substantial distance from the rearward end of the drum screen 24. The end plate 156 is also visible in the section of FIG. 3. The end plate 156 is supported in the frame structure 10 (FIG. 1) and supports the rear ends of the beater shafts as well as mounting the drive structure for the beaters. Referring to the main beater 22, its rear end stub shaft 138a (FIG. 1C) mounts two large sprockets of equal size side by side, the front sprocket 158 appearing in FIG. 1C and the other one being directly behind it. The sprocket 158 drives a chain 160 which turns a sprocket 161 on a stub shaft 162 for the stripper beater 22a seen in FIG. 3. As also seen in FIG. 1C, the chain 160 passes over an idler sprocket 164 and 166 which drive the stub shaft 162 for the stripper beater 22a in a counterclockwise direction as seen in FIG. 3. As is further seen in FIG. 1C, the sprocket (not visible) that is just behind sprocket 158 drives a chain 168 that turns a sprocket 169 on the stub shaft 170 for a control beater 22b in a clockwise direction as seen in FIG. 3. The gearing just described in FIG. 1C is in a compartment 172 (FIG. 2) at the rear of the machine.

As seen in FIG. 3, there are two other beaters, a stripper beater 22c and a sieving beater 22d, also within the drum screen. These are driven by gearing shown in FIGS. 1B and 4, which is mounted on the front of the previously mentioned fixed front plate 130, described in FIG. 5, without reference to the gearing. This gearing is driven from the jack shaft 150 which, as shown in FIG. 1A is driven by the belt 146 from the engine 14. The front stub shaft 174 for the stripper beater 22c (FIG. 3) carries a sprocket 175 which is driven by a chain 176 that passes around an upper idler 177 directly behind an idler 178, around a lower idler 179 directly behind an idler 180, around an intermediate idler 182 and around a sprocket (not visible) dirctly behind a sprocket 184 on the jackshaft 150. This construction rotates the stripper beater 22c in the counterclockwise direction indicated in FIG. 3.

The sieving beater 22d (FIG. 3) is also driven from the jackshaft 150, as previously mentioned. The front stub shaft 190 of the beater 22d mounts a sprocket 192 (FIGS. 1B and 4) which is driven by a chain 194 to drive the beater 22d is a clockwise direction. The chain 194 passes around the previously mentioned upper front idler 178, the lower front idler 180 and around the front sprocket 184, also previously mentioned on the main engine driven countershaft 150. Thus, the engine drives the main beater 22 and the auxiliary beaters 22a, 22b, 22c and 22d which provides an effective threshing action on the crop, as described in the aforesaid copending application for a multi-beater thresher, United States application to Looker et al., Ser. No. 141,900, filed May 10, 1971 and assigned to the FMC Corporation.

DRUM SCREEN DRIVE

As previously mentioned, the drum screen 24 has end rings 26,28 (FIG. 2) that are supported on rollers 30, 32 (FIGS. 1 and 2) along the near side of the screen, and on rollers 34 (FIG. 4) and 36 (FIG. 3) along the off side of the screen. The nearside rollers 30,32 are mounted on a shaft 200 (FIGS. 1 and 3) which is driven by a hydraulic motor 202 (FIG. 4). The shaft 200 is supported along its length in frame brackets indicated at 204 in FIG. 1. The offside rollers 34,36 are mounted on a shaft 200a (FIG. 4) which is supported in the same manner by brackets 204a but which is not driven.

CROP CONVEYOR BELT

The crop conveyor belt 50 receives shelled peas, beans etc. from the drum screen 24 and the side panels 44, 46 of the shroud 40 (FIG. 3) and carries them forwardly to the bucket conveyor 52 (FIGS. 2 and 4). The conveyor 50 includes a rubberized fabric belt 209 mounted on a rear roller 210 (FIGS. 2 and 3) and a front roller 212 (FIG. 2).

The mounting for the rear roller 210 is seen in FIG. 3, wherein the roller stub shafts 214 are supported on bearings in the main side channels of the frame 10. The front or crop deiivery roller 212 of the conveyor 50 is similarly mounted and is driven by a hydraulic motor 216 (FIGS. 1D and 4) which drives a chain 218 and a sprocket 220 on the shaft 222 for the front roller 212. A rotatable brush 224 is disposed below the front end of the crop conveyor 50 for cleaning the belt 209 which brush is driven by a sprocket 226 on the roller shaft 222 and a chain 228 (FIG. 1D).

As best seen in FIG. 2, and in accordance with the present invention, the crop delivery roller 212 is well in front of the drum screen 24, which construction cooperates with the auger feeds 18, 20 to provide a room for the superposed primary fan or blower 62.

BUCKET CONVEYOR

The bucket conveyor 52 receives shelled crop from the crop belt 50 as best seen in FIG. 2 and elevates it onto a crop delivery conveyor 54 at the top front of the harvester. In the embodiment of the invention shown the bucket conveyor 52 comprises a series of small buckets 240 (FIG. 4) mounted on laterally spaced chains 242, only one of which appears in FIG. 4. The chains 242 are trained around a lower arcuate carrier guide 244,245, an upper corner guide 246 and along a vertical wall 248 which closes the buckets as does the upper guide 246. However, as the buckets 240 pass over the conveyor 54 in their inverted condition, the shelled product P drops between the chains 242 and onto the conveyor 54 for delivery to the dump hopper 60, (FIG. 2).

The bucket conveyor chains 242 are driven by sprockets 248, one of which appears in FIG. 4, on a shaft 249 which shaft is driven by a hydraulic motor 250 shown in dotted lines in FIG. 4. Th bucket conveyor 50 is protected by a U-shaped channel housing indicated generally at 252.

BLOWERS

The primary blower 62, (FIGS. 2 and 4) clears chaff and trash from the delivery end of the crop conveyor 50 (FIG. 2), as the crop is dropped into the bucket conveyor 52. The infeed auger assembly 20, which projects forwardly past the drum screen, provides a location for mounting a primary blower 62 of adequate size, directly above the delivery end of the projecting delivery end of the crop conveyor 50.

The blower 62 has a housing 62a (FIG. 4) surrounding a fan blade 63 that is driven by a hydraulic motor 254 (FIG. 4) which drives paired V-belts 256 and a fan pulley 258. The blower 62 has a laterally flared inlet duct 259 (FIGS. 2 and 4) that leads directly up from the delivery end of the conveyor 50 to an opening 259a in the fan housing. This blower cleans trash out of the product and delivers it to the exhaust duct 64 (FIG. 2). The fan housing 62a is downwardly inclined and connects to the duct 64 by a front panel 65 that is downwardly inclined at a steeper angle, namely that of the auger housing 90. As a result of this construction, both ducts 259 and 64 are essentially straight. This blower disposition and construction affords excellent cleaning efficiency without increase in the dimensions of the harvester. If the infeed auger 20 were omitted with the twin augers 18 feeding directly into the drum screen, the blower 62 would have to be placed to one side, so that the trash would turn corners and drop out during the cleaning operation.

The upper or secondary blower 66, previously mentioned, which draws trash from the forward running delivery belt 54 that delivers product to the product hopper 60, is driven by a hydraulic motor 67 as seen in FIG. 2.

SHROUD CLEARING MECHANISM

This mechanism, which forms the subject matter of the aforesaid copending application of Looker et al., Ser. No. 272,617, (SJ 5329) prevents adherence of crop to the depending side panels of the shroud 40 that surrounds the drum screen 24. As previously mentioned and as seen in FIG. 3, the depending side panel 44, at the upwardly turning side of the drum screen 24 is laterally oscillated to insure that no product will adhere thereto and hence become spoiled or mildewed. The upper edge of the panel 44 is hinged at 260 to the frame, so as to form a continuation of a vertical shroud panel 262. The lower end of the panel 44 is provided with a stop flange 264 which engages a rubber stop flange 265 on the frame 10, when the panel 44 is in its lowered or retracted position.

In order to oscillate the panel 44 cam brackets 270 (FIGS. 1 and 3) are secured along the panel 44. The brackets 270, and hence the side panel 44 are engaged by a cam rod 278 (FIG. 3) welded to the shaft 200 that mounts the drum supporting rollers. Thus rotation of the roller shaft 200 during operation of the drum screen by the hydraulic motor 202 (FIG. 1) causes the cam rods 278 to wipe against the brackets 270 and oscillates the panel 44 between its retracted position shown in solid lines in FIG. 3 and its lifted or advanced position shown in broken lines in that figure.

The effect of this oscillation of the side plate 44 in dislodging material that otherwise might adhere to the panel has been previously described, and is illustrated generally in FIG. 3.

As seen in FIG. 3, the depending side panel 46 of the shroud that is opposite to the oscillating side panel 44 is contoured to conform to the drum screen 24. A flexible wiper 280 of rubberized fabric or the like is bolted to a T-bracket 282 secured to the periphery of the drum screen 24. As the drum screen rotates downwardly in this area, crop P such as peas or the like and other material that tends to adhere to the side panel 46, are wiped clear thereof with each revolution of the drum screen, and hence falls clear of the panel 46 onto the crop belt 50 (FIG. 3). The curved panel 46 has a continuation 47 that is recurved or inclined outwardly in a manner in which crops will not normally pass along that panel and hence will not adhere thereto.

CATWALKS

Because of the fact that simple nonclogging side panels of the present invention are provided, easy access is had to the drum screen for cleaning and maintenance. This access is provided by a pair of catwalks 290 (FIG. 3) having guard rails 292 disposed along the vertical panels 262,262a of the shroud 40. Access to the drum screen itself is provided for forming the upper portion 42 of the shroud as a series of hinged elements. Thus, a narrow elongated fixed panel 294 is secured to the end plates of the shroud, and hinged to the panel 294 and extending in opposite directions therefrom are upper shroud panels 296,296a, the hinges being shown at 297 in FIG. 3. Hinged to the outer edges of panels 296,296a by hinges 298 are depending upper side panels 300,300a and lift handles 302 are provided on these panels. At the right of FIG. 3 the hinged panels 296a, 300a are shown in dotted lines as they are being raised toward a fully open position at which time both sets of panels can be pulled against one another resting on fixed panels 304. This provides access to the drum screen from the catwalks 290 for purposes previously described.

OPERATION

The overall operation of a pea or bean combine embodying the present invention has been described in detail and need not be repeated. The improvement of the present invention relates to the crop feeding auger units 18 and 20 and to the relation of these units which facilitates the mounting of a straight duct primary fan or blower 62 (FIG. 2).

Referring first to FIG. 2, the pickup unit 16 picks up a large band of crop from a windrow W, which crop includes a mass of vines with attached leguminous pods for peas, beans or the like. The pickup belt 76 (FIG. 8) assisted by the side rake fingers 78 direct this band of crop into the elevating auger unit 18. As seen in FIG. 2, the crop is directed to the upper portions of the lower ends of the elevating augers 94,94a (FIG. 8.) The lower side portions of these augers (FIG. 10) in cooperation with the auger housing channels 92,92a feed and elevate the crop without compacting it into the inlet opening 127a (FIGS. 5 and 7) formed at the flared lower wall portion 127 of the lower wall 126 of the infeed auger housing 120.

As the infeed auger 122, since this is spaced from the lower wall 126 (FIG. 4) and from the down-coming side wall 128a but is close to the upturning side wall 128 and since the crop is fed into the auger from beneath, a clear nonjamming entry passage or chamber is provided for the crop as it is propelled by the lower portions of the flight 134 of the infeed auger 122.

This uncompacted flow of crop, after entering the interior of the drum screen 24, through the infeed auger housing 120, drops clear of the auger towards the bottom of the screen 24 as seen in FIGS. 2 and 5. Dropping the crop in this manner assists in fluffing the vines somewhat so that the threshing action of the drum screen 25 and the associated beaters is efficient and requires a minimum dwell time within the screen. The fresh crop, such a peas beans or the like, drop through the drum screen onto the forwardly running crop conveyor belt 50 as previously described and as seen in FIG. 2 the vines V work their way out of the rear end of the screen (which is open) and fall to the ground.

As seen in FIG. 2, the crop conveyor 50 projects well past the front shroud plate 130 (see also FIG. 4) for the drum screen assembly 24, and delivers the crop to the transversely running bucket conveyor 52 for further disposition as previously described. As also seen in FIG. 2, the steeply ascending elevator auger assembly 18 is joined to the bottom of the infeed auger housing 120. This feeder construction, coupled with the forward extension of the cross conveyor 50 provides ample room for the primary fan or trash cleaning blower 62 of adequate size, and directly above the cleaning zone. Thus the incoming duct 259 for that blower can be straight without requiring elbows or the like. This straight, laterally flared duct 259, is disposed directly above the crop as it drops off of the front roller 212 of the crop conveyor 50. As is also seen in FIG. 2, this construction of the augers and the crop conveyor 50, coupled with the downward inclination of the blower housing 62a, accommodates a substantially straight, downwardly directed trash discharge duct 64 which further reduces the chances of clogging the primary trash blowing unit.

The twin elevating augers 94,94a are easily protected by the guard bars 98 (FIG. 8) which provides a safety feature in that this type of elevating system is less likely to injure than are the more conventional type of upwardly running rake fingers. The lower cantilever bearing unit 104 (FIGS. 2 and 11) for the elevating augers, can be disposed for unobstructed feed to the upper portions of the lower ends of these augers, and since no bearings are required for the delivery ends of the augers, compaction of the crop is further eliminated at the auger elevator and infeed auger junction.

Thus, it can be seen that constructing the elevating conveyor and the infeed auger in accordance with the present invention, and with the crop delivery conveyor 50 disposed as described, a large mass of vine crop such as peas, beans or the like can be handled without compaction and hence can be threshed efficiently without crop damage. Furthermore, provision is made for efficient trash removal by a primary blower or fan at the zone where the fresh crop received from the drum screen is delivered to the final conveyor system for the ultimate filling of a dump hopper or the like on the harvester.

Although the best mode contemplated for carrying out the preent invention has been herein shown and described, it will be apparent that modification and variation may be made without departing from what is regarded to be the subject matter of the invention.

I claim:

1. In a field legume harvester of the type having a mobile chassis with means for picking up a crop of vines and attached legumes in the field, a rotating drum screen, a rotating beater substantially at the center of said screen, means for feeding unthreshed crop into said drum screen, and a threshed crop conveyor running forwardly beneath said screen; the improvement wherein said beater has a front infeed auger projecting axially past the drum screen, an infeed auger housing having a peripheral wall surrounding said infeed auger and an end wall, said infeed auger housing having a feed opening formed in the lower, axially outer portion of the peripheral wall of the housing, a pair of oppositely rotating, side by side crop elevating augers, said augers being upwardly inclined for feeding crop into said opening in the lower portion of said infeed auger housing, an elevating auger conforming housing around the lower portions of said elevating augers and connected to said infeed auger housing at the latter's feed opening, the lateral extent of said two elevating augers being substantially equal to the diameter of said infeed auger, said crop pickup means feeding the crop of vines and attached legumes to the lower ends of said elevating augers.

2. The harvester of claim 1, wherein the lower portion of said infeed auger housing peripheral wall is widely spaced from the infeed auger whereas the sidewall portion of said peripheral wall on the upwardly turning side of said infeed auger is very close to the auger for providing a nonjamming feed zone beneath the infeed auger while minimizing vine wrap around by the auger.

3. The harvester of claim 2, wherein the side wall portion of said auger housing peripheral wall on the downwardly turning side of said infeed auger is also widely spaced from said infeed auger.

4. The harvester of claim 3, wherein the upper portion of said auger housing peripheral wall is very close to the upper portion of said infeed auger.

5. The harvester of claim 2, wherein the lower portion of the peripheral wall of said housing is formed with a flared section leading upwardly and rearwardly from said infeed opening to the remainder of said lower wall portion.

6. The harvester of claim 1, wherein said crop pickup means feeds the crop to the upper sides of the lower ends of said elevating augers.

7. The harvester of claim 6, wherein the lower end of said elevating auger housing has an end plate, and outboard bearings on said end plate for the lower ends of said elevating augers, the upper ends of said augers being supported solely by said housing.

8. In a field legume harvester of the type having a mobile chassis with means for picking up a crop of vines and attached legumes in the field, a rotating drum screen, a rotating beater substantially at the center of said screen, means for feeding unthreshed crop into said drum screen, and a threshed crop conveyor running forwardly beneath said screen; the improvement wherein said beater has a front infeed auger projecting axially past the drum screen, an infeed auger housing having a peripheral wall surrounding said infeed auger and an end wall, said infeed auger housing having a feed opening formed in the lower, axially outer portion of the peripheral wall of the housing, upwardly inclined crop elevating conveyor means for feeding crop from said pickup means into said opening in the lower portion of said infeed auger housing, the delivery end of said threshed crop conveyor extending forwardly past said drum screen, and a trash removal fan including a fan housing mounted directly above the delivery end of said crop conveyor and beneath said infeed auger housing and said crop elevating conveyor means, said fan having a laterally flared inlet duct extending straight down from the fan housing to the delivery end of said crop conveyor.

9. The harvester of claim 8, wherein the fan housing has a discharge direct extending substantially straight down from the front side of the fan housing to the ground.

10. The harvester of claim 9, wherein said fan housing is forwardly and downwardly inclined.

* * * * *